US011936113B2

(12) United States Patent
Thomas et al.

(10) Patent No.: US 11,936,113 B2
(45) Date of Patent: Mar. 19, 2024

(54) ANTENNA ARRAY ASSEMBLY

(71) Applicant: Cambium Networks Ltd, Ashburton (GB)

(72) Inventors: Jomon Thomas, Karnataka (IN); Deepu Nair, Karnataka (IN); Visalakshy Tc, Karnataka (IN); Nigel King, Ashburton (GB); Varun Hegde, Karnataka (IN)

(73) Assignee: Cambium Networks Ltd, Ashburton (GB)

( * ) Notice: Subject to any disclaimer, the term of this patent is extended or adjusted under 35 U.S.C. 154(b) by 193 days.

(21) Appl. No.: 17/534,045

(22) Filed: Nov. 23, 2021

(65) Prior Publication Data

US 2022/0085518 A1 Mar. 17, 2022

Related U.S. Application Data

(63) Continuation of application No. PCT/GB2020/051231, filed on May 20, 2020.

(30) Foreign Application Priority Data

May 23, 2019 (IN) ............................ 201941020526

(51) Int. Cl.
*H01Q 21/08* (2006.01)
*H01Q 9/04* (2006.01)
(Continued)

(52) U.S. Cl.
CPC ........... *H01Q 21/08* (2013.01); *H01Q 9/0414* (2013.01); *H01Q 1/246* (2013.01); *H01Q 1/42* (2013.01); *H01Q 1/48* (2013.01)

(58) Field of Classification Search
CPC ....... H01Q 21/08; H01Q 9/0414; H01Q 21/10
(Continued)

(56) References Cited

U.S. PATENT DOCUMENTS

2003/0043076 A1 3/2003 Carson et al.
2006/0139231 A1 6/2006 Kimura
(Continued)

FOREIGN PATENT DOCUMENTS

IN 201941020526 A 11/2020
WO WO 1998/36472 8/1998
WO WO 2020/234590 A1 11/2020

OTHER PUBLICATIONS

International Search Report and Written Opinion of corresponding PCT Application No. PCT/GB2020/051231 dated Oct. 2, 2020 (15 pages).

(Continued)

*Primary Examiner* — Peguy Jean Pierre
(74) *Attorney, Agent, or Firm* — Crowell & Moring LLP

(57) ABSTRACT

An antenna array assembly comprises a ground plate, a linear array of patch radiator elements disposed in a spaced parallel relationship with a first face of the ground plate, and a first, second, third and fourth elongate passive radiator, each comprising one or more substantially planar conductive parts which are electrically isolated from the ground plate. The first and second elongate passive radiators are disposed symmetrically on either side of the linear array and parallel to a centre line of the linear array, on the same side of the ground plate as the linear array. The third and fourth elongate passive radiators are disposed further from the linear array than are the first and second elongate passive radiators. Each of the third and fourth elongate passive radiators is narrower than and projects further from the ground plate than does each of the first and second elongate passive radiators.

20 Claims, 7 Drawing Sheets

(51) Int. Cl.
*H01Q 1/24* (2006.01)
*H01Q 1/42* (2006.01)
*H01Q 1/48* (2006.01)

(58) Field of Classification Search
USPC .......................................................... 341/893
See application file for complete search history.

(56) References Cited

U.S. PATENT DOCUMENTS

| | | | |
|---|---|---|---|
| 2007/0146225 A1 | 6/2007 | Boss et al. | |
| 2013/0342409 A1* | 12/2013 | Tatarnikov ........... | H01Q 9/0414 343/729 |
| 2017/0271758 A1 | 9/2017 | Nair et al. | |

OTHER PUBLICATIONS

First Examination Report for India Application No. 201941020526 dated Jan. 15, 2024 (5 pp.).

* cited by examiner

ANTENNA ARRAY ASSEMBLY

CROSS-REFERENCE TO RELATED APPLICATIONS

This application is a continuation of International Patent Application No. PCT/GB2020/051231 filed on May 20, 2020, and published in English as WO 2020/234590 A1 on Nov. 26, 2020, which claims priority from Indian Application No. 201941020526, filed on May 23, 2019, the entirety of each of which are hereby fully incorporated by reference.

TECHNICAL FIELD

The present invention relates generally to an antenna array, and more specifically, but not exclusively, to an antenna array assembly for a cellular wireless sector antenna having improved beam shape with a broad main beam and faster roll-off.

BACKGROUND

In modern wireless systems, such as, for example, cellular wireless access and fixed wireless access networks, there is a need for equipment, such as radio transceiver equipment in user equipment or at base stations or access points, which is economical to produce, while having high performance at radio frequencies. Increasingly high radio frequencies are being used as spectrum becomes scarce and demand for bandwidth increases. Furthermore, antenna systems are becoming increasingly sophisticated, often employing arrays of antenna elements to provide controlled beam shapes and/or MIMO (multiple input multiple output) transmission.

It is known to implement a radio transceiver having an array of antenna radiator elements. A feed network may connect the antenna elements to transmit and receive chains of the transceiver. A ground plate may be provided, which may underlie the array of radiator elements, and which provides a radio frequency ground for the radiator elements.

In some arrangements of a cellular wireless networks, in particular in LTE 4G networks, it may beneficial to operate with a frequency plan having a frequency re-use factor of 1, that is to say that adjacent sectors are operated using the same frequency band. In this case, signals transmitted in one sector may appear as interference to the adjacent sector. The coding and modulation schemes used for the transmission and reception of signals provide a tolerance of interference from other sectors, but there is typically some reduction in capacity at the boundaries between sectors. Ideally a sector antenna would have a flat, i.e. constant gain over the width of the sector in the main beam, and then a sharp cut off at angles outside the sector to minimise interference to an adjacent sector. A single linear array of patch antennas may conventionally be used as a sector antenna, for example covering a 120 degree sector, but the performance may be limited in terms of gain flatness within the sector and rate of cut-off outside the sector. It is possible to increase the width of a main beam and increase the rate of cut off by the use of a two-dimensional array of patch antennas, but such an array is physically large and complex.

It is an object of the invention to mitigate the problems of the prior art.

SUMMARY

In accordance with a first aspect of the present invention, there provided an antenna array assembly, comprising:

a ground plate;

a linear array of patch radiator elements disposed in a spaced parallel relationship with a first face of the ground plate; and a first and second elongate passive radiator each comprising one or more substantially planar conductive parts disposed to be generally upstanding in relation to the first face of the ground plate and being electrically isolated from the ground plate, the first and second elongate passive radiators being disposed symmetrically on either side of the linear array and parallel to a centre line of the linear array, on the same side of the ground plate as the linear array;

a third and fourth elongate passive radiator each comprising one or more substantially planar conductive parts disposed to be generally upstanding in relation to the first face of the ground plate, and being electrically isolated from the ground plate, the third and fourth elongate passive radiators being disposed symmetrically on either side of the linear array and parallel to the centre line of the linear array, on the same side of the ground plate as the linear array, and further from the linear array than are the first and second elongate passive radiators, wherein a width of each of the first and second elongate passive radiators measured in a direction pointing away from the first face of the ground plate is greater than a width of each of the third and fourth elongate passive radiators measured in a direction pointing away from the first face of the ground plate, and wherein each of the each of the third and fourth elongate passive radiators is spaced from the first face of the ground plate by a first distance such that each of the third and fourth elongate passive radiators projects further from the ground plate than does each of the first and second elongate passive radiators.

The combination of the third and fourth passive radiators outside the first and second radiators, and with a width less than that of the first and second radiators, but protruding further from the ground plate than the first and second radiators, has been found to provide a broad main beam with a fast roll-off. The first and second radiators may broaden the beam, while the third and fourth passive radiators disposed as specified may give a faster cut off, counteracting the effect of the first and second radiators outside the main beam.

In an embodiment of the invention, the width of each of the first and second elongate passive radiators is in the range 0.4 to 0.6 wavelengths, and in an example substantially half a wavelength, at at least one operating frequency of the antenna array assembly and the width of each of the third and fourth elongate passive radiators is in the range 0.2 to 0.4 wavelengths, and in an example substantially a quarter wavelength at at least one operating frequency of the antenna array assembly.

Antenna array assemblies with passive radiators having the specified widths may give particularly good performance.

In an embodiment of the invention, each of the first and second elongate passive radiators is disposed 0.4 to 0.6 wavelengths, and in an example substantially half a wavelength, away from the centre line of the linear array of patch radiator elements at at least one operating frequency of the antenna array assembly and each of the third and fourth elongate passive radiators is disposed 0.8 to 1.2 wavelengths, and in an example one wavelength away from the centre line of the linear array of patch radiator elements at a operating frequency of the antenna array assembly. Antenna array assemblies with passive radiators situated in this way may give particularly good performance.

In an embodiment of the invention, the antenna array assembly comprises a fifth and sixth elongate passive radiator each comprising one or more substantially planar conductive parts disposed to be generally upstanding in relation to the first face of the ground plate and being electrically isolated from the ground plate, the fifth and sixth elongate passive radiators being disposed symmetrically on either side of the linear array and parallel to the centre line of the linear array, on the same side of the ground plate as the linear array, and further from the linear array than are the first and second elongate passive radiators, wherein each of the each of the fifth and sixth elongate passive radiators is spaced from the first face of the ground plate by a second distance such that each of the first and second elongate passive radiators projects further from the ground plate than does each of the fifth and sixth elongate passive radiators.

The provision of the fifth and sixth elongate passive radiators may improve the roll-off of the antenna response in azimuth outside the main beam in combination with the third and fourth passive radiators.

In an embodiment of the invention, each of the fifth and sixth elongate passive radiators has a width in the range 0.2 to 0.4 wavelengths, and in an example substantially a quarter of a wavelength, at at least one operating frequency of the antenna array assembly.

In an embodiment of the invention, at least some of the respective substantially planar conductive parts of the first and second elongate passive radiators are arranged in a respective zigzag arrangement in a cross-section taken in a plane parallel to the first face of the ground plane.

The combination of the zig-zag arrangement with the passive radiators may provide increased cross-polar isolation in combination with the broad beamwidth and fast roll-off.

In an embodiment of the invention, each of the first and second elongate passive radiators is inclined towards the linear array of patch radiator elements by an angle of less than 10 degrees from perpendicular to the first face of the ground plate.

This may give an improved beam shape in terms of a broad beamwidth and fast roll-off in combination with the other claimed features.

In an embodiment of the invention, each of the third and fourth elongate passive radiators is inclined towards the linear array of patch radiator elements by an angle of less than 10 degrees to from perpendicular to the first face of the ground plate.

This may give an improved beam shape in terms of a broad beamwidth and fast roll-off in combination with the other claimed features.

In an embodiment of the invention, the antenna array assembly comprises a first and second elongate conductive wall each being disposed symmetrically on either side of the linear array and parallel to the centre line of the linear array, on the same side of the ground plate as the linear array, and closer to the linear array than are the first and second elongate passive radiators, wherein the first and second elongate conductive walls are electrically connected to the first face of the ground plate and are substantially perpendicular to the first face of the ground plate, protruding from the ground plate by less than a quarter of a wavelength at at least one operating frequency of the antenna array assembly.

The conductive walls may provide an improved beam shape in terms of a broad beamwidth and fast roll-off in combination with the other claimed features.

In an embodiment of the invention, the ground plate comprises a base plate to which the first and second elongate passive radiators are mounted and a raised section disposed between the base plate and the patch radiator elements comprising at least part of the first face of the ground plate.

This may provide a convenient mounting method for the linear array.

In an embodiment of the invention, each patch radiator element comprises a first planar part disposed in a spaced parallel relationship to the first face of the ground plate and a second planar part disposed in a spaced parallel relationship to the first planar part, on the side of the first planar part away from the first face of the ground plate.

This may give an improved beam shape in terms of a broad beamwidth and fast roll-off in combination with the other claimed features.

In an embodiment of the invention, each patch radiator element is configured to radiate at orthogonal polarisations substantially +/−45 degrees to the centre line of the linear array.

The zig-zag shaped passive radiators may provide particularly good isolation between these orientations of polarisation.

In an embodiment of the invention, the third and fourth elongate passive radiators are attached to a radome covering the antenna array assembly.

This may provide a convenient method of suspending the passive radiators above the ground plate.

In an embodiment of the invention, the edge of each of the third and fourth elongate passive radiators closest to the first face of the ground plate are substantially the same distance from the first face of the ground plate as are the edges of the first and second elongate passive radiators furthest from the first face of the first face of the ground plate.

This may give an improved beam shape in terms of a broad beamwidth and fast roll-off in combination with the other claimed features.

In an embodiment of the invention, each of the first and second elongate passive radiators is composed of a series of sections, each comprising one or more substantially planar conductive parts, wherein a gap is provided between each section of 0.2 to 0.4 wavelengths, and for example a quarter of a wavelength, at at least one operating frequency of the antenna array assembly.

The provision of gaps may provide increased isolation between the elements of the array while maintaining high cross-polar isolation and an improved beam shape.

In an embodiment of the invention, each section has a length measured in a direction parallel to the centre line of the linear array in the range 0.4 to 0.6 wavelengths, and for example half a wavelength at at least one operating frequency of the antenna array assembly.

This spacing of the gaps allows the sections to line up with a respective patch radiator element so that the gaps line up with the spaces between patch radiator elements.

This may provide increased isolation between the elements of the array while maintaining high cross-polar isolation and an improved beam shape.

Further features and advantages of the invention will be apparent from the following description of preferred embodiments of the invention, which are given by way of example only.

DETAILED DESCRIPTION

By way of example, embodiments of the invention will now be described in the context of an antenna array assembly having a ground plate which is a backing plate for an array of printed antenna elements for use as a sector antenna for an access point of a fixed wireless access system operating according to a 4G LTE coding, modulation and signalling scheme. However, it will be understood that this is by way of example only and that other embodiments may be antenna array assemblies in other wireless systems, including mobile wireless systems operating according to 3GPP 4G LTE standards, and according to 5G or other standards, operating in a variety of signal transmission bands. In an embodiment of the invention, an operating frequency range of approximately 2.3 to 2.7 GHz, with a centre frequency of 2.5 GHz is used, but the embodiments of the invention are not restricted to this frequency, and in particular embodiments of the invention are suitable for use at lower or higher operating frequencies of up to 20 GHz or even higher.

Figure 1:
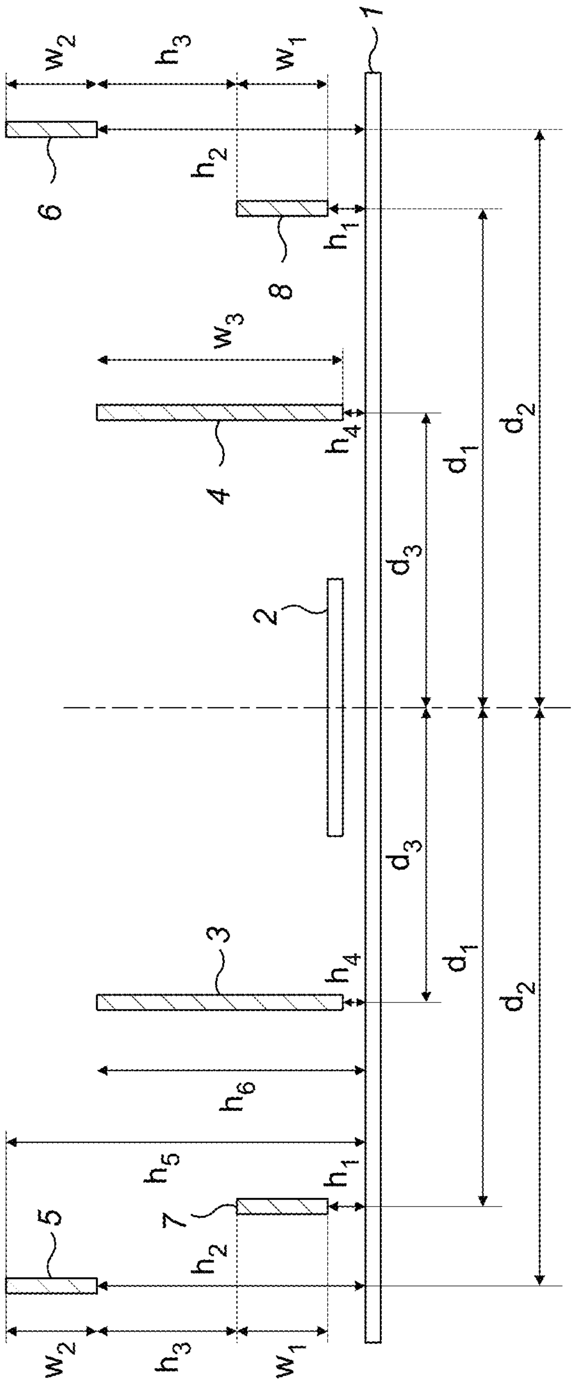
FIG. 1 shows a schematic representation of an antenna array assembly in cross-section.
Figure 2:
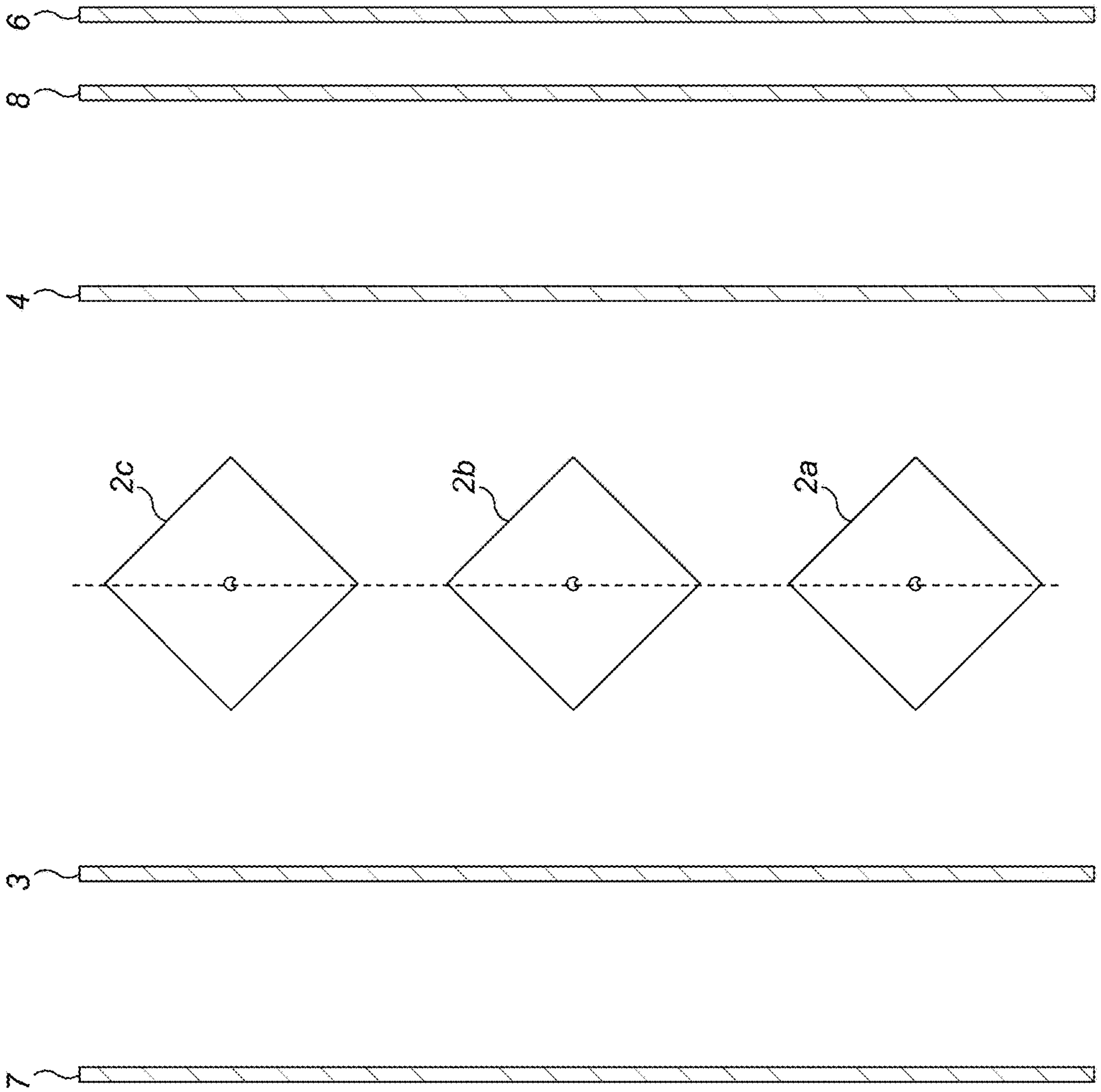
FIG. 2 shows a schematic representation of the antenna array assembly of FIG. 1 with a viewing angle perpendicular to the ground plate view.

FIGS. 1 and 2 are schematic diagrams of an antenna array assembly in an embodiment of the invention. As shown, a linear array of patch radiator elements 2, 2*a*-2*c* have a spaced relationship, typically a parallel spaced relationship, with a first face of a ground plate 1. The first face is the side facing the patch radiator elements, and may have a substantially planar centre section underlying the patch radiator elements which is raised towards the patch radiator elements with respect to substantially planar parts either side of the centre section. The ground plate is a conductive, typically metallic structure and may comprise two or more parts, for example the centre section may be manufactured as a separate piece and mounted to a lower section underlying the centre section and forming the substantially planar parts either side of the centre section. The parts of the ground plate may be connected together electrically, by contact and/or by metallic fixings, to form a single grounded structure, providing a radio frequency ground for the radiator elements and feed tracks that may be provided to conduct signals to and/or from the patch radiator elements.

As may be seen from FIG. 1 in cross-sectional view and FIG. 2 in plan view, the antenna array assembly is provided with first and second elongate passive radiators 3, 4 which are placed symmetrically on either side of the linear array and parallel to a centre line of the linear array, on the same side of the ground plate as the linear array. The first and second elongate passive radiators 3, 4 are electrically isolated from the ground plate and from each other, acting as parasitic flanges, which may receive and re-radiate radiation. The first and second elongate passive radiators 3, 4 may each be composed of a single substantially planar conductive part, such as a strip of aluminium or other metal, or each may be composed of more than one part. For example, each elongate passive radiator may be composed of a series of section distributed along the length of the radiator with gaps in between the sections. The sections themselves may each be composed of one or more conductive parts, for example arranged in a zig-zag arrangement when seen in plan view. The parts arranged in the zig-zag may each be substantially planar, which may be connected by right angled corners or by curved sections. The sections may be corrugated and/or scalloped, and may comprise a series of alternate ridges and furrows. An elongate passive radiator may be also be referred to as a radiator arrangement, an array of one or more radiator elements, or a passive radiating barrier.

As shown in FIG. 1, the first and second elongate passive radiators 3, 4 may be perpendicular to the first face of the ground plate. However, the first and second elongate passive radiators 3, 4 may in alternative arrangements be generally upstanding from the ground plate, but at an angle to the perpendicular. The one or more substantially planar conductive parts may be disposed to be generally upstanding in relation to the first face of the ground plane, and in some embodiments at an angle of at least 75 degrees to the first face of the ground plate, that is to say offset from the vertical by up to about 15 degrees in some embodiments, and typically at an angle of 85 degrees to the first face of the ground plate.

As shown in FIGS. 1 and 2, the antenna array assembly is provided with another pair of elongate passive radiators 5, 6, electrically isolated from the ground plate and from each other, situated outside the first and second elongate passive radiators and each being narrower, and being offset from the ground plate so that they project further from the first face of the ground plate than do the first and second elongate passive radiators, despite being narrower. As shown in FIG. 1, typically $w_3>w_2$, and $h_5>h_6$.

As shown in the example of FIG. 1, the second pair of elongate passive radiators 5, 6, which may be referred to as the third elongate passive radiator 5, and the fourth elongate passive radiator 6, may each be substantially perpendicular to the first face of the ground plate 1. In alternative arrangements, the third and fourth elongate passive radiators are disposed to be generally upstanding in relation to the first face of the ground plate and may be inclined by an angle of up to about 15 degrees from the vertical, i.e. from the perpendicular, that is to say disposed at an angle of at least 75 degrees to the first face of the ground plate. In ab example of an arrangement the third and fourth elongate passive radiators may each tilt inwards towards the array of patch radiator elements at an angle of up to about 10 degrees from perpendicular. The third and fourth elongate passive radiators 5, 6 may each comprise a single substantially planar conductive part, such as a strip of aluminium or another metal. However, there may be embodiments in which the third and fourth elongate passive radiators 5, 6 each comprise more than one substantially planar conductive part, and may comprise sections separated by gaps.

So, the substantially planar conductive parts are disposed to be generally upstanding in relation to the first face of the ground plate and electrically isolated from the ground plate, the third and fourth elongate passive radiators being disposed symmetrically on either side of the linear array and parallel to the centre line of the linear array, on the same side of the ground plate as the linear array, and further from the linear array than are the first and second elongate passive radiators. The centre line of the linear array of patch radiator elements may be referred to as a long axis of the array. The long axis typically runs through the centres of the patch radiator elements, as shown in FIG. 2 by the broken line.

As has already been mentioned, the inner pair of radiators is narrower than the outer pair, that is to say a width of each of the first and second elongate passive radiators 3, 4 measured in a direction pointing away from the first face of the ground plate is greater than a width of each of the third and fourth elongate passive radiators 5, 6 measured in a direction pointing away from the first face of the ground plate. Each of the each of the third and fourth elongate passive radiators 5, 6 is spaced from the first face of the ground plate 1 by a first distance $h_2$ such that each of the third and fourth elongate passive radiators 5, 6 projects further from the ground plate 1 than does each of the first and second elongate passive radiators 3, 4.

The combination of third and fourth passive radiators 5, 6 outside first and second passive radiators 3, 4, and with a width $w_2$ less than the width $w_3$ of the first and second radiators, but protruding further from a ground plate 1 than the first and second radiators, has been found to provide a broad main beam with a fast roll-off. The first and second radiators 3, 4 tend to broaden the beam, while the third and fourth passive radiators 5, 6 tend to give a faster cut off, counteracting the effect of the first and second radiators outside the main beam.

Particularly good performance may be achieved in some embodiments when the width $w_3$ of each of the first and second elongate passive radiators 3, 4 is in the range 0.4 to 0.6 wavelengths, and in one example substantially half a wavelength at at least one operating frequency of the antenna array assembly and the width $w_2$ of each of the third and fourth elongate passive radiators 5, 6 is in the range 0.2 to 0.4 wavelengths, and in an example substantially a quarter wavelength at at least one operating frequency of the antenna array assembly.

Also, particularly good performance may be achieved in some embodiments when each of the first and second elongate passive radiators 3, 4 is disposed at a distance $d_3$ of 0.4 to 0.6 wavelengths, and in an example substantially half a wavelength, away from the centre line of the linear array of patch radiator elements at at least one operating frequency of the antenna array assembly and each of the third and fourth elongate passive radiators is disposed at a distance $d_2$ of 0.8 to 1.2 wavelengths, and in an example one wavelength away from the centre line of the linear array of patch radiator elements at at least one operating frequency of the antenna array assembly.

Further improvements to the roll-off of the antenna response in azimuth outside the main beam may be achieved in some embodiments by the provision of a fifth and sixth elongate passive radiator 7, 8, as shown in FIGS. 1 and 2, which may have a similar composition and width to the third and fourth elongate passive radiators 5, 6, which are situated closer to the ground plate 1 than are the third and fourth elongate passive radiators 3, 4, so that $h_1<h_2$ as shown in FIG. 1. As shown in FIGS. 1 and 2, each of the fifth and sixth elongate passive radiators 7, 8 is situated symmetrically on either side of the linear array and parallel to the centre line of the linear array, on the same side of the ground plate as the linear array, and further from the linear array than are the first and second elongate passive radiators 3, 4. As shown in FIGS. 1 and 2, each of the fifth and sixth elongate passive radiators 7, 8 is formed of a single planar conductive part and is orientated to be perpendicular to the first face of the ground plate 1. In other embodiments, the fifth and sixth elongate passive radiators 7, 8 may be formed form more than one planar conductive part, and may be inclined away from being perpendicular to the ground plate. In some embodiments each of the fifth and sixth elongate passive radiators 7, 8 comprises one or more substantially planar conductive parts disposed to be generally upstanding in relation to the ground plate and in some embodiments at an angle of at least 75 degrees to the first face of the ground plate and is electrically isolated from the ground plate. Each of the each of the fifth and sixth elongate passive radiators 7, 8 is spaced from the first face of the ground plate 1 by a second distance $h_1$ such that each of the first and second elongate passive radiators 3, 4 projects further from the ground plate 1 than does each of the fifth and sixth elongate passive radiators 7, 8.

In an embodiment of the invention, each of the fifth and sixth elongate passive radiators has a width in the range 0.2 to 0.4 wavelengths, and in an example substantially a quarter of a wavelength, at at least one operating frequency of the antenna array assembly.

Figure 3:
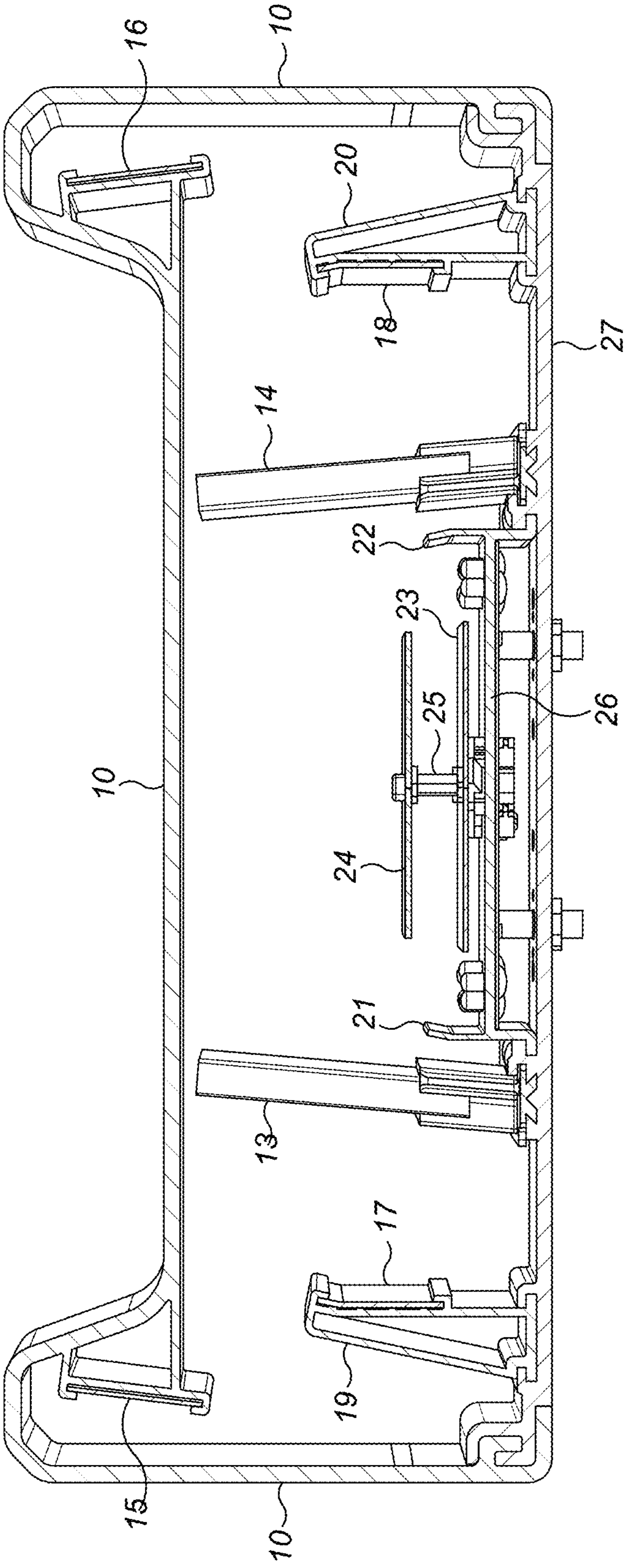
FIG. 3 shows a truncated oblique cross-sectional view of an embodiment of an antenna array assembly.
Figure 4:
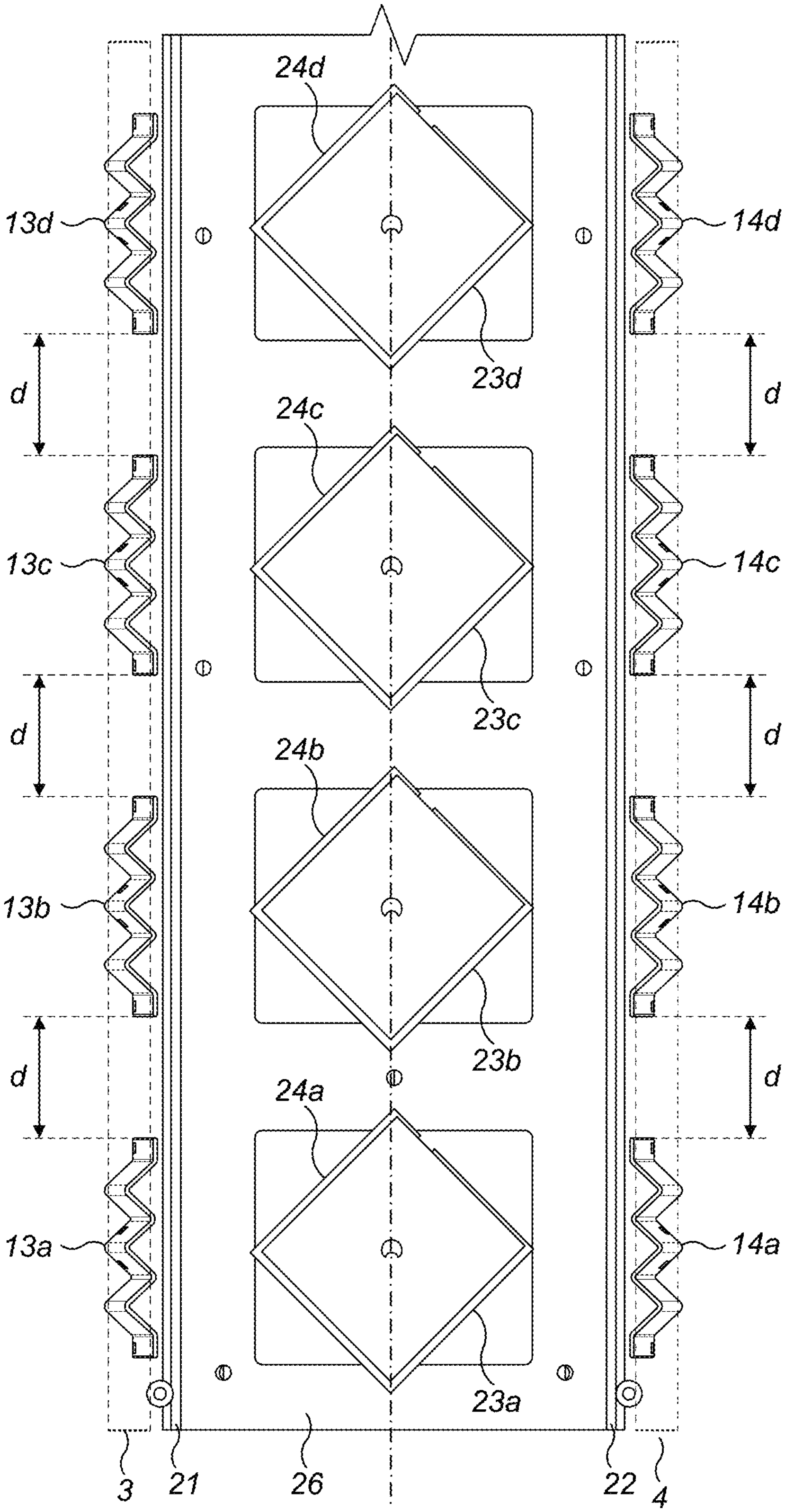
FIG. 4 shows a part of an embodiment of the antenna array assembly with a viewing angle perpendicular to the ground plate.
Figure 5:
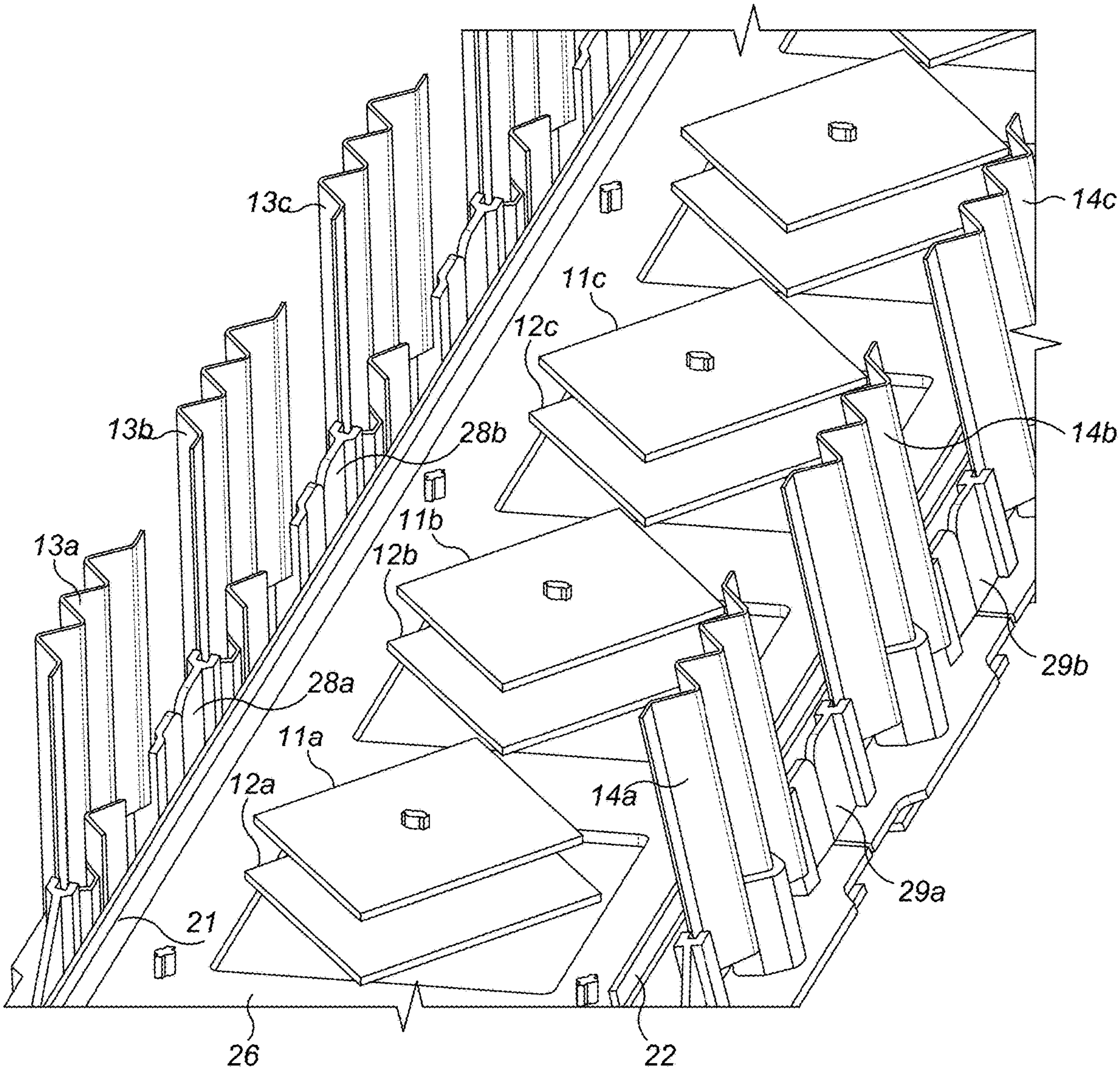
FIG. 5 is an oblique view of part of an embodiment of the antenna array assembly.
Figure 6:
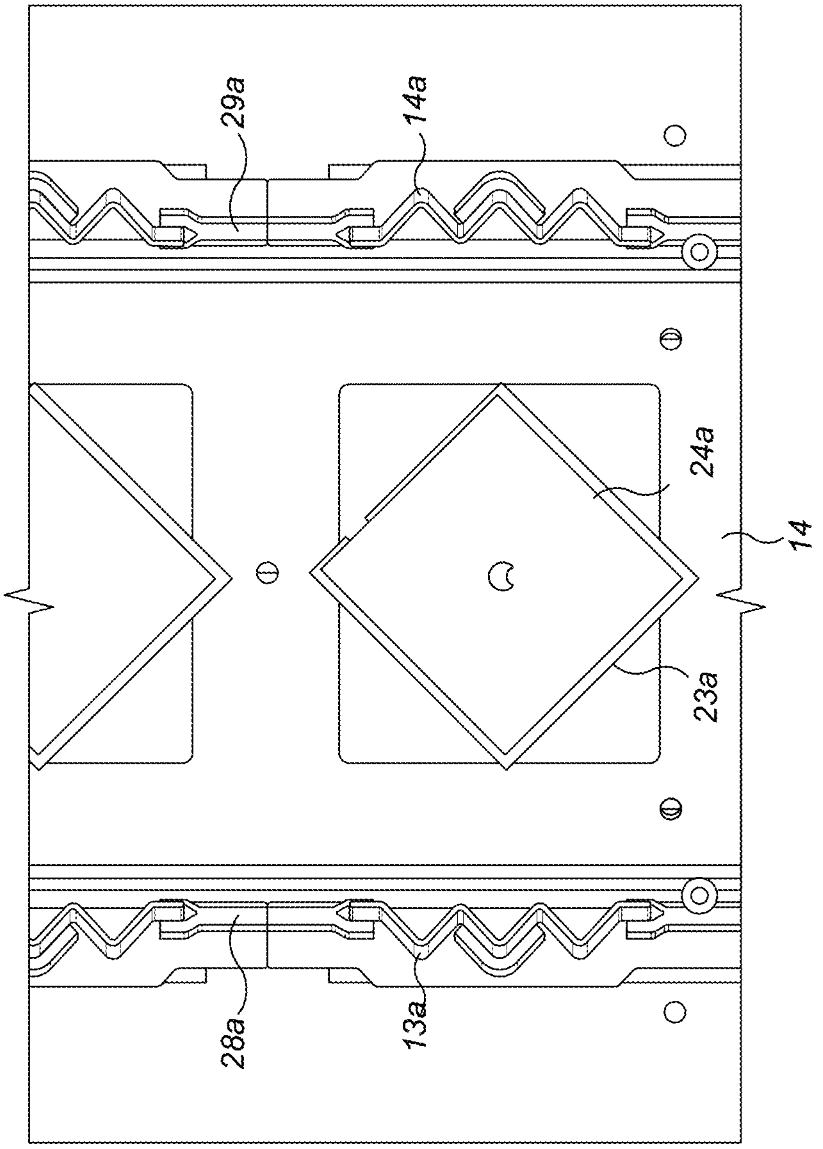
FIG. 6 is a view of part of an embodiment of the antenna array assembly with a viewing angle perpendicular to the ground plate.

FIGS. 3-6 show an antenna array assembly in an embodiment of the invention, which may be used as a sector antenna for an access point for operation in a cellular system having approximately 120 degree sectors. FIG. 3 shows a cross-sectional view of an embodiment of an antenna array assembly, the cross-section being in a plane perpendicular to the centre line of a linear array of patch radiator elements. FIG. 4 shows a plan view of part of an embodiment, showing the first passive radiator 3 as a series of sections 13*a*-13*d* and the second passive radiator 4 as a series of sections 14*a*-14*d*. FIG. 5 is an oblique view of part of an embodiment of the antenna array assembly, and FIG. 6 is a plan view of part of an embodiment of the antenna array assembly.

It may be seen from FIGS. 3-6 that a ground plate 27, 26 is provided across the base of the sector antenna, that is to say the antenna array assembly, extending substantially across the width of the antenna array assembly. The ground plate acts as a radio frequency ground reference for the antenna, and may comprise more than one part connected together electrically. In the embodiment shown, there is a central section 26, which acts as a support for the antenna elements, which are patch radiator elements 23, 24 in FIGS. 3 and 23*a*-*d* and 24*a*-*d* as shown in at least some of FIGS. 4, 5 and 6. As shown, the patch radiator elements are orientated with each side of a square patch at substantially + or −45 degrees to the centre line of the antenna array, shown in FIG. 4 as a broken line. This is so that the patch radiator elements, in conjunction with the ground plate, each forms a patch antenna that radiates and/or receives with linear orthogonal polarisations orientated at +/−45 degrees to the centre line of the antenna array, as is well known in the art. In alternative embodiments, the patch radiators may be configured to radiate in nominally vertical and horizontal polarisations, for example using square patches with two sides parallel to the centre line of the array. Patch radiator elements may be fed with signals using probes connected to a feed network running, for example, below the central section 26 of the ground plate, or the patch radiators may be edge fed for example, or fed by signals passing through a aperture, according to a wide variety of patch antenna implementation arrangements well-known in the art. Typically, the antenna array arrangement used as a sector antenna in a cellular system would be mounted on a tower at an access point, which may be an access point of a fixed wireless access system, for example proving data connections for residential and commercial premises in a geographical area. The sector antenna may be mounted with the centre line of the antenna array orientated approximately vertically, but may be provided with a slight down tilt either by the mechanical fixing arrangement of by the phasing of the signals fed to the patch radiator elements. The patch radiator elements may each have a first patch part 23, typically a planar conductive metallic square in a spaced parallel planar relationship with the ground plate 26, 27 and a second, similar but typically slightly smaller, patch part 24 situated in a planar parallel relationship with the first patch part, which may act as a director to shape the beam from the patch radiator element. The second patch part 24 may be separated from the first patch part 23 by a non-conducting spacer 25.

As shown in FIG. 3 in a truncated oblique cross-sectional view, first and second elongate passive radiators are provided, comprising sections 13 and 14 respectively which are shown truncated cross-section. As shown in FIG. 4, the first and second elongate passive radiators 3, 4, corresponding to the elongate passive radiators 3 and 4 shown schematically in FIGS. 1 and 3, comprise a series of sections 13*a*-13*d* and 14*a*-14*d* respectively, each section being separated by a gap d of approximately a quarter wavelength at at least one operating frequency of the antenna array assembly. In the example shown, the width of each of the first and second elongate passive radiators 3, 4, measured in a direction pointing away from the ground plate 27, 26, is substantially 0.43 wavelengths at a centre frequency of operation. The width corresponds to $w_3$ in FIG. 1. The first and second elongate passive radiators 3, 4, and so also the sections of the first and second elongate passive radiators 13*a*-13*d* and 14*a*-14*d* respectively, are situated in this example approximately a half a wavelength from the centre of a patch antenna element, i.e. from the centre line of the array. This corresponds to distance $d_3$ in FIG. 1. In the embodiment shown, the first and second passive radiators are inclined slightly towards each other, by up to 10 degrees from perpendicular to the plane of the ground plate. As shown in particular in FIG. 3 and FIG. 5, the sections 13*a*-13*c* and 14*a*-14*c* which are typically metallic and electrically conductive, are attached to the ground plate by non-conductive support parts, which may be made from electrically insulating material such as plastic or a non-conductive composite material. As shown in FIGS. 5 and 6, there are supporting non-conductive spacers 28*a*, 28*b* and 29*a*, 29*b* provided between adjacent sections of the first and second elongate passive radiators 3, 4. In an alternative embodiment, the first and second elongate passive radiators may be attached to the radome instead of or in addition to being attached to the ground plate.

As also shown in FIG. 3, there are provided third and fourth elongate passive radiators 15, 16, which are supported in this embodiment by brackets formed in the non-conductive radome 10, which covers the antenna array assembly and gives environmental protection and allows radiation to pass in and out of antenna array assembly, as an antenna beam typically with a centre approximately perpendicular to the ground plate. For a sector antenna mounted with the centre line of the array approximately vertical, the azimuth direction is typically in the plane of the cross section of FIG. 3. In this example, the third and fourth elongate passive radiators 15, 16, which correspond to the third and fourth elongate passive radiators 5, 6 in the schematic views of FIGS. 1 and 2, are mage of flat metallic strips with the long dimension extending parallel to the centre line of the array, that is to say extending into and out of the paper in the cross-sectional view of FIG. 3. In the example shown, the width of each of the third and fourth elongate passive radiators 15, 16, measured in a direction pointing away from the ground plate 27, 26, is substantially a quarter of a wavelength at a centre frequency of operation. The width corresponds to $w_2$ in FIG. 1. The third and fourth elongate passive radiators 15, 16, are situated in this example approximately a wavelength from the centre of a patch antenna element, i.e. from the centre line of the array. This corresponds to distance $d_2$ in FIG. 1. In this example, the third and fourth elongate passive radiators are inclined towards each other slightly from perpendicular to the ground plate, by about 10-20 degrees, and are spaced by substantially half a wavelength from the ground plate. This corresponds to dimension $h_2$ in FIG. 1.

As also shown in FIG. 3, there are provided fifth and sixth elongate passive radiators 17, 18, which are supported in this embodiment by non-conductive brackets 19, 20 which are mounted on the ground plate 27. In this example, the fifth and sixth elongate passive radiators 17, 18, which correspond to the fifth and sixth elongate passive radiators 7, 8 in the schematic views of FIGS. 1 and 2, are made of flat metallic strips with the long dimension extending parallel to the centre line of the array, that is to say extending into and out of the paper in the cross-sectional view of FIG. 3. In the example shown, the width of each of the fifth and sixth elongate passive radiators 17, 18, measured in a direction pointing away from the ground plate 27, 26, is substantially quarter of a wavelength at a centre frequency of operation. The width corresponds to $w_1$ in FIG. 1. The fifth and sixth elongate passive radiators 17, 18, are situated in this example between three quarters of a wavelength and a wavelength from the centre of a patch antenna element, i.e. from the centre line of the array. This corresponds to distance $d_1$ in FIG. 1. In this example, the fifth and sixth elongate passive radiators are substantially perpendicular to the ground plate, and spaced by less than a quarter wavelength from the ground plate. This corresponds to dimension $h_1$ in FIG. 1. The fifth and sixth elongate passive radiators may have a first substantially perpendicular section in relation to the ground plate and a second section connected to the first section which is inclined towards the array of radiator elements.

An aspect of some embodiments relates to using combination of three flanges symmetrically on the both sides of the linear patch array. The first flange has a height that corresponds to half of the wavelength at the centre frequency and separated by approximately half wavelength from the centre of a patch. This may help to create a wide beam pattern at the centre, for example with nominally 90 degrees of beamwidth, by combining the main radiation form the patch array plus the secondary radiation from the flanges. In an example, the beamwidth to a roll off point of 1.4 dB from peak may be 80 degrees, and the beamwidth to a roll off point of 3 dB may be in the range 92 degrees. The 6 dB (+/−2 dB) beamwidth may be 120 degrees, and the roll off from 60 degrees to 90 degrees may be −16 dB. The second set of two flanges may have a height equaling to quarter of the wavelength and separated by nearly one wavelength. These flanges are oriented at different heights and angles from the top patch. These two flanges help to create the required roll off in the pattern.

As may be seen from FIG. 4, at least some of the respective substantially planar conductive parts of the first and second elongate passive radiators 3, 4 may arranged in a respective zigzag arrangement in a cross-section taken in a plane parallel to the first face of the ground plane. As may be seen, the alternating planar conducting parts of each section 13*a*-13*d* and 14*a*-14*d* of the first and second elongate passive radiators 3, 4 are arranged as a zig zag. The combination of the zig-zag arrangement with the passive radiators may provide increased cross-polar isolation in combination with the broad beamwidth and fast roll-off. In the example shown, each section has three planar conducting parts at a first angle to the centre line of the linear array, and three planar conducting parts at a second angle to the centre line of the linear array, arranged alternately. In the example shown, the first angle is substantially −45 degrees and the second angle is substantially +45 degrees.

As may be seen from FIGS. 3, 4 and 5, in an embodiment of the invention, the antenna array assembly may comprise a first and second elongate conductive wall 21, 22, connected electrically to the ground plate, each being disposed symmetrically on either side of the linear array and parallel to the centre line of the linear array, on the same side of the ground plate as the linear array, and closer to the linear array than are the first and second elongate passive radiators 3, 4. The first and second elongate conductive walls 21, 22 are substantially perpendicular to the first face of the ground plate, protruding from the ground plate by less than a quarter of a wavelength at at least one operating frequency of the antenna array assembly. The conductive walls may provide an improved beam shape in terms of a broad beamwidth and fast roll-off in combination with the other claimed features.

Each patch radiator element is configured to radiate at orthogonal polarisations substantially +/−45 degrees to the centre line of the linear array. The zig-zag shaped passive radiators may provide particularly good isolation between these orientations of polarisation.

In an embodiment of the invention, the edge of each of the third and fourth elongate passive radiators closest to the first face of the ground plate are substantially the same distance from the first face of the ground plate as are the edges of the first and second elongate passive radiators furthest from the first face of the first face of the ground plate. This may give an improved beam shape in terms of a broad beamwidth and fast roll-off in combination with the other claimed features.

Each of the first and second elongate passive radiators 3, 4 may be composed of a series of sections, each comprising one or more substantially planar conductive parts, wherein a gap is provided between each section of 0.2 to 0.4 wavelengths, and for example a quarter of a wavelength, at at least one operating frequency of the antenna array assembly. The provision of gaps may provide increased isolation between the elements of the array while maintaining high cross-polar isolation and an improved beam shape. Each section has a length measured in a direction parallel to the centre line of the linear array in the range 0.4 to 0.6 wavelengths, and for example half a wavelength at at least one operating frequency of the antenna array assembly. This spacing of the gaps allows the sections to line up with a respective patch radiator element so that the gaps line up with the spaces between patch radiator elements.

The ground plate and the elongate passive radiators may be composed of a solid metal such as aluminium, or may be composed of a non-conductive material having a conductive coating. This may allow the ground plate to be light weight and to be moulded in a shape to include the conductive walls, which may be an economical manufacturing method. The non-conductive moulding may comprise a plastic material and the conductive surface may comprise copper.

Figure 7:
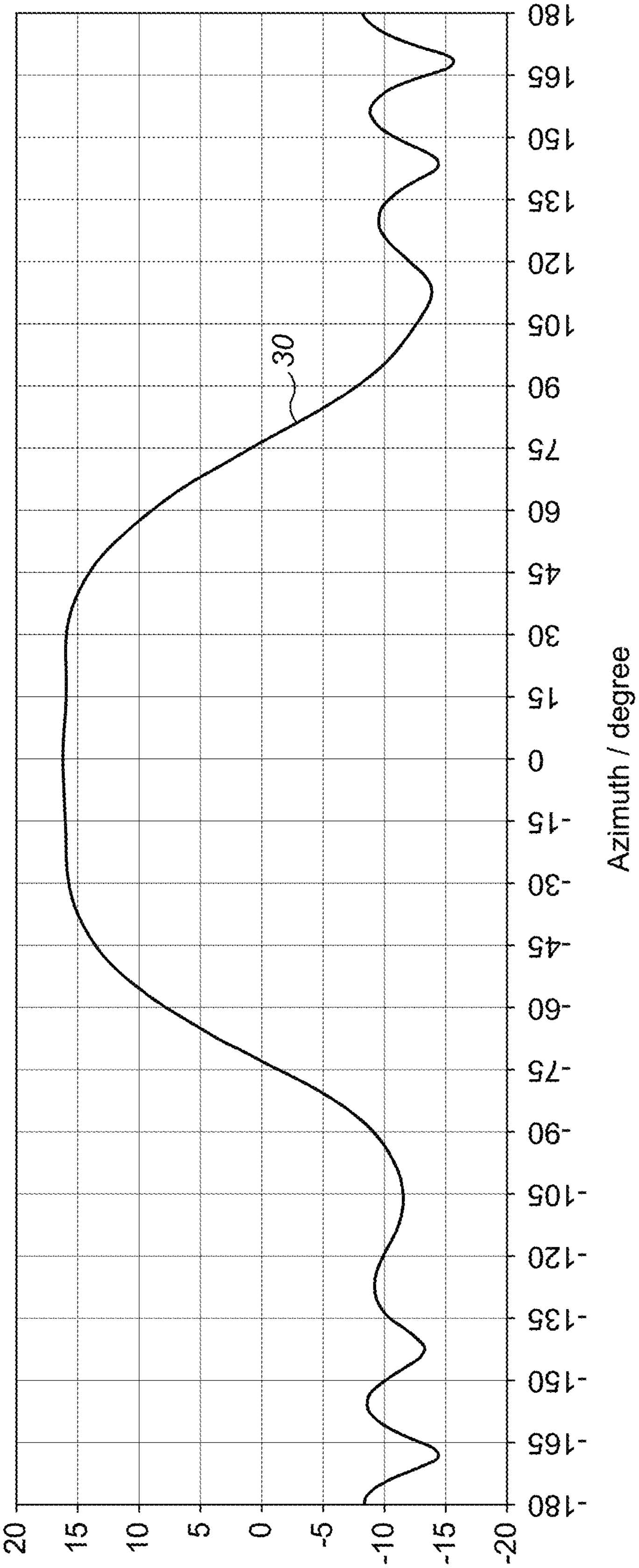
FIG. 7 shows a gain response of an embodiment of an antenna array assembly in azimuth.

FIG. 7 shows a radiation plot 30 for the embodiment of the antenna array assembly illustrated in FIGS. 3-6. The horizontal scale is in azimuth, which as has already been described is substantially in the plane of the cross-section of FIG. 3, with the peak of the beam radiating approximately in a perpendicular direction to the ground plate 27, 26. The vertical scale is in dBi. This illustrates that the main beam is flatter and broader than would be achieved by use of a conventional linear array of patch antenna elements for a sector antenna, and that the cut off outside the +/−60 degree points is faster than for a conventional sector antenna. In an example of a conventional antenna having a linear array of patch radiator elements, the −3 dB beamwidth may be 80 degrees, as opposed to over 90 degrees in the present case, whereas the ~6 dB beamwidth may be similar in both cases, indicating that embodiments of the invention have a faster roll-off than a conventional antenna. This reduces the angular sector of the coverage region in which a user may receive signals at similar levels from two adjacent sectors, so increasing capacity in a cellular system with a frequency re-use factor of 1.

As is well known in the art, a patch radiator element disposed over a ground plate, forming a patch antenna, is a type of radio antenna with a low profile, which can be mounted on a flat surface. It may consist of a flat rectangular sheet or "patch" of metal, mounted over a larger sheet of metal called a ground plane. The assembly may be contained inside a plastic radome, which protects the antenna structure from damage. The metal sheet above the ground plane may be viewed as forming a resonant piece of microstrip transmission line with a length of approximately one-half wavelength of the radio waves. The radiation mechanism may be viewed as arising from discontinuities at each truncated edge of the microstrip transmission line. The radiation at the edges may cause the antenna to act slightly larger electrically than its physical dimensions, so in order for the antenna to be resonant, a length of microstrip transmission line slightly shorter than one-half a wavelength at the frequency may used to form the patch.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. An antenna array assembly, comprising:

a ground plate;

a linear array of patch radiator elements disposed in a spaced parallel relationship with a first face of the ground plate; and a first and second elongate passive radiator each comprising one or more substantially planar conductive parts disposed to be generally upstanding in relation to the first face of the ground plate and being electrically isolated from the ground plate, the first and second elongate passive radiators being disposed symmetrically on either side of the linear array and parallel to a centre line of the linear array, on the same side of the ground plate as the linear array;

a third and fourth elongate passive radiator each comprising one or more substantially planar conductive parts disposed to be generally upstanding in relation to to the first face of the ground plate and being electrically isolated from the ground plate, the third and fourth elongate passive radiators being disposed symmetrically on either side of the linear array and parallel to the centre line of the linear array, on the same side of the ground plate as the linear array, and further from the linear array than are the first and second elongate passive radiators, wherein a width of each of the first and second elongate passive radiators measured in a direction pointing away from the first face of the ground plate is greater than a width of each of the third and fourth elongate passive radiators measured in a direction pointing away from the first face of the ground plate, and wherein each of the each of the third and fourth elongate passive radiators is spaced from the first face of the ground plate by a first distance such that each of the third and fourth elongate passive radiators projects further from the ground plate than does each of the first and second elongate passive radiators.

2. The antenna array assembly of claim 1, wherein the width of each of the first and second elongate passive radiators is in the range 0.4 to 0.6 wavelengths at an operating frequency of the antenna array assembly and the width of each of the third and fourth elongate passive radiators is in the range 0.2 to 0.4 wavelengths at a operating frequency of the antenna array assembly.

3. The antenna array assembly of claim 1, wherein the width of each of the first and second elongate passive radiators is substantially half a wavelength at at least one operating frequency of the antenna array assembly and the width of each of the third and fourth elongate passive radiators is substantially a quarter wavelength at at least one operating frequency of the antenna array assembly.

4. The antenna array assembly of claim 1, each of the first and second elongate passive radiators is disposed 0.4 to 0.6 wavelengths away from the centre line of the linear array of patch radiator elements at an operating frequency of the antenna array assembly and each of the third and fourth elongate passive radiators is disposed 0.8 to 1.2 wavelengths away from the centre line of the linear array of patch radiator elements at at least one operating frequency of the antenna array assembly.

5. The antenna array assembly of claim 1, each of the first and second elongate passive radiators is disposed substantially half a wavelength away from the centre line of the linear array of patch radiator elements at at least one operating frequency of the antenna array assembly and each of the third and fourth elongate passive radiators is disposed substantially one wavelength away from the centre line of the linear array of patch radiator elements.

6. The antenna array assembly of claim 1, comprising a fifth and sixth elongate passive radiator each comprising one or more substantially planar conductive parts disposed to be generally upstanding in relation to the first face of the ground plate and being electrically isolated from the ground plate, the fifth and sixth elongate passive radiators being disposed symmetrically on either side of the linear array and parallel to the centre line of the linear array, on the same side of the ground plate as the linear array, and further from the linear array than are the first and second elongate passive radiators, wherein each of the each of the fifth and sixth elongate passive radiators is spaced from the first face of the ground plate by a second distance such that each of the first and second elongate passive radiators projects further from the ground plate than does each of the fifth and sixth elongate passive radiators.

7. The antenna array assembly of claim 6, wherein each of the fifth and sixth elongate passive radiators has a width in the range 0.2 to 0.4 wavelengths at at least one operating frequency of the antenna array assembly.

8. The antenna array assembly of claim 6, wherein each of the fifth and sixth elongate passive radiators has a width of substantially a quarter wavelength at at least one operating frequency of the antenna array assembly.

9. The antenna array assembly of claim 1, wherein at least some of the respective substantially planar conductive parts of the first and second elongate passive radiators are arranged in a respective zigzag arrangement in a cross-section taken in a plane parallel to the first face of the ground plane.

10. The antenna array assembly of claim 9, wherein each of the first and second elongate passive radiators is inclined towards the linear array of patch radiator elements by an angle of less than 10 degrees from perpendicular to the first face of the ground plate.

11. The antenna array assembly of claim 9, wherein each of the third and fourth elongate passive radiators is inclined towards the linear array of patch radiator elements by an angle of less than 10 degrees to from perpendicular to the first face of the ground plate.

12. The antenna array assembly of claim 1, comprising a first and second elongate conductive wall each being disposed symmetrically on either side of the linear array and parallel to the centre line of the linear array, on the same side of the ground plate as the linear array, and closer to the linear array than are the first and second elongate passive radiators, wherein the first and second elongate conductive walls are electrically connected to the first face of the ground plate and are substantially perpendicular to the first face of the ground plate, protruding from the ground plate by less than a quarter of a wavelength at at least one operating frequency of the antenna array assembly.

13. The antenna array assembly of claim 1, wherein the ground plate comprises a base plate to which the first and second elongate passive radiators are mounted and a raised section disposed between the base plate and the patch radiator elements comprising at least part of the first face of the ground plate, wherein the first and second elongate passive radiators are mounted on the ground plate by insulating fixings.

14. The antenna array assembly of claim 1, wherein each patch radiator element comprises a first planar part disposed in a spaced parallel relationship to the first face of the ground plate and a second planar part disposed in a spaced parallel relationship to the first planar part, on the side of the first planar part away from the first face of the ground plate.

15. The antenna array assembly of claim 1, wherein each patch radiator element is configured to radiate at orthogonal polarisations substantially +/−45 degrees to the centre line of the linear array.

16. The antenna array assembly of claim 1, wherein the third and fourth elongate passive radiators are attached to a radome covering the antenna array assembly.

17. The antenna array assembly of claim 1, wherein the edge of each of the third and fourth elongate passive radiators closest to the first face of the ground plate are substantially the same distance from the first face of the ground plate as are the edges of the first and second elongate passive radiators furthest from the first face of the first face of the ground plate.

18. The antenna array assembly of claim 1, wherein each of the first and second elongate passive radiators is composed of a series of sections, each comprising one or more substantially planar conductive parts, wherein a gap is provided between each section of 0.2 to 0.4 wavelengths at at least one operating frequency of the antenna array assembly, wherein each section has a length measured in a direction parallel to the centre line of the linear array in the range 0.4 to 0.6 wavelengths at at least one operating frequency of the antenna array assembly.

19. The antenna array assembly of claim 18, wherein each section has a length measured in a direction parallel to the centre line of the linear array of substantially a half wavelength at at least one operating frequency of the antenna array assembly.

20. The antenna array assembly of claim 1, wherein each of the first and second elongate passive radiators is composed of a series of sections, each comprising one or more substantially planar conductive parts, wherein a gap is provided between each section of substantially a quarter wavelength at at least one operating frequency of the antenna array assembly.

* * * * *